US012512077B2

(12) United States Patent
Shibazaki et al.

(10) Patent No.: US 12,512,077 B2
(45) Date of Patent: Dec. 30, 2025

(54) DISPLAY DEVICE AND METHOD OF CONTROLLING DISPLAY DEVICE

(71) Applicant: Sharp Display Technology Corporation, Kameyama (JP)

(72) Inventors: Akira Shibazaki, Kameyama (JP); Tetsuya Fujikawa, Kameyama (JP); Yusuke Nishihara, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/604,650

(22) Filed: Mar. 14, 2024

(65) Prior Publication Data

US 2024/0355302 A1 Oct. 24, 2024

(30) Foreign Application Priority Data

Apr. 21, 2023 (JP) ................................ 2023-070063

(51) Int. Cl.
*G09G 3/36* (2006.01)
*G09G 3/3225* (2016.01)

(52) U.S. Cl.
CPC ......... *G09G 3/3614* (2013.01); *G09G 3/3225* (2013.01); *G09G 3/3648* (2013.01); *G09G 2300/0426* (2013.01); *G09G 2310/08* (2013.01)

(58) Field of Classification Search
None
See application file for complete search history.

(56) References Cited

U.S. PATENT DOCUMENTS 8,242,990 B2 * 8/2012 Song .................... G09G 3/3685 345/87
2002/0075205 A1 * 6/2002 Kimura ................ G09G 3/3659 345/55
2003/0020699 A1 * 1/2003 Nakatani ............. G09G 3/3611 345/204
2015/0187308 A1 * 7/2015 Shin ..................... G09G 3/3614 345/99
2016/0035297 A1 * 2/2016 Oh ....................... G09G 3/2092 345/94
2016/0210919 A1 * 7/2016 Nakanishi ............ G09G 3/3648
2017/0047021 A1 * 2/2017 Yashiki .................... G09G 3/34
2018/0166023 A1 * 6/2018 Tomizawa ............. H04N 23/71
2018/0211616 A1 * 7/2018 Li ........................ G09G 3/3688
2018/0357975 A1 12/2018 Sone et al.
2019/0058029 A1 * 2/2019 Woo ..................... G09G 3/3258

FOREIGN PATENT DOCUMENTS

WO 2017/130860 A1 8/2017

* cited by examiner

*Primary Examiner* — Patrick N Edouard
*Assistant Examiner* — Peijie Shen
(74) *Attorney, Agent, or Firm* — ScienBiziP, P.C.

(57) ABSTRACT

A display device includes: a pixel electrode; a drive circuit configured to charge the pixel electrode in accordance with an image signal; and a control unit configured to control a timing when the drive circuit charges the pixel electrode, wherein, when a cycle in which the image signal is changed is changed from a first cycle to a second cycle that is longer than the first cycle, the control unit causes the drive circuit to charge the pixel electrode in accordance with an identical image signal more than once in one cycle in which the image signal is changed.

5 Claims, 3 Drawing Sheets

FIRST COMPARATIVE EXAMPLE

DISPLAY DEVICE AND METHOD OF CONTROLLING DISPLAY DEVICE

BACKGROUND

1. Field

The present disclosure relates to a display device and a method of controlling the display device.

2. Description of the Related Art

International Publication No. 2017/130860 discloses a display device that performs pause driving in which writing to pixels is paused to display a still image. In this display device, in transition from a pause period during which the pause driving is performed to a driving period during which an image signal voltage is written to a pixel through scanning of a scanning signal line, high-speed scanning and gradation value emphasis driving are performed. The high-speed scanning refers to writing of an image signal voltage of the same polarity to a pixel at a second speed higher than a first speed at which an image signal voltage obtained in accordance with an image signal is written to a pixel. The gradation value emphasis driving refers to an operation in which a gradation value is corrected for image data of a first frame immediately after the start of the driving period and for image data of a second frame immediately following the first frame. Thus, in this display device, flicker is kept from being perceived in transition from the pause period to the driving period.

Here, in the display device, a transition is sometimes made from a state in which application of an image signal voltage (writing of an image) to a pixel is performed at 60 Hz to a state in which writing of an image is performed at 1 Hz. In this case, the number of times a pixel is charged decreases from 60 times a second to once a second. Furthermore, in the display device, a time period taken for a single charge is not changed, and thus, a case where writing of an image is performed at 1 Hz is longer in the time interval between operations of writing to a pixel than a case where writing of an image is performed at 60 Hz. Furthermore, there is off-state leakage in a pixel TFT. Consequently, in transition from a period during which a cycle in which an image signal is changed is short to a period during which the cycle in which the image signal is changed is long, a change (reduction) in luminance occurs.

Thus, the present disclosure has been made to deal with such issues and provides a display device and a method of controlling the display device in which a change in luminance can be reduced even when a transition is made from a state in which a cycle in which an image signal is changed is short to a state in which the cycle in which the image signal is changed is long.

SUMMARY

To deal with the above-described issues, a display device according to a first aspect of the present disclosure includes a pixel electrode, a drive circuit that charges the pixel electrode in accordance with an image signal, and a control unit that controls a timing when the drive circuit charges the pixel electrode. When a cycle in which the image signal is changed is changed from a first cycle to a second cycle that is longer than the first cycle, the control unit causes the drive circuit to charge the pixel electrode in accordance with an identical image signal more than once in one cycle in which the image signal is changed.

Furthermore, a method of controlling a display device according to a second aspect of the present disclosure is a method of controlling a display device including a pixel electrode, and a drive circuit that charges the pixel electrode. The method includes acquiring an image signal, and, when a cycle in which the image signal is changed is changed from a first cycle to a second cycle that is longer than the first cycle, causing the drive circuit to charge the pixel electrode in accordance with an identical image signal more than once in one cycle in which the image signal is changed.

DESCRIPTION OF THE EMBODIMENTS

Figure 1:
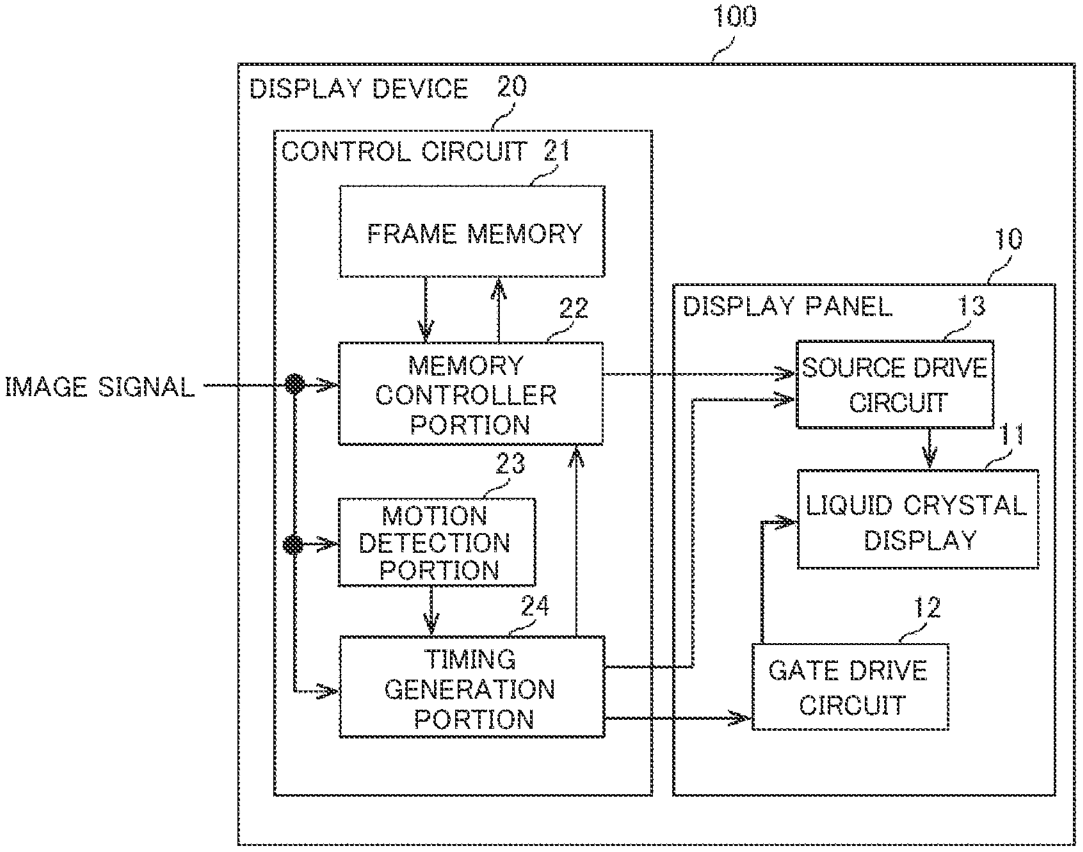
FIG. 1 is a block diagram illustrating a schematic configuration of a display device according to one embodiment.

An embodiment of the present disclosure will be described below with reference to the drawings. Note that the present disclosure is not to be limited to the following embodiment, and appropriate design changes can be made within a range in which configurations of the present disclosure are satisfied. Furthermore, in the following description, the same reference numerals are used in different drawings to denote the same portions or portions with similar functions, and a repetitive description of the portions is omitted. Furthermore, configurations described in the embodiment and modifications may be appropriately combined or may be changed without departing from the gist of the present disclosure. To give an easy-to-understand explanation, in drawings that are referred to below, a simplified or schematic configuration is illustrated, or some of components are omitted.

First Embodiment (Entire Configuration of Display Device)

FIG. 1 is a block diagram illustrating a schematic configuration of a display device 100 according to a first embodiment. The display device 100 is a device that displays an image (video) in accordance with an image signal (R, G, B) supplied from a host controller (hereinafter referred to as "host"), which is not illustrated. Examples of the display device 100 include a personal computer, a tablet, a smartphone, a smartwatch, and a television device. The display device 100 includes a display panel 10, and a control circuit 20.

Figure 2:
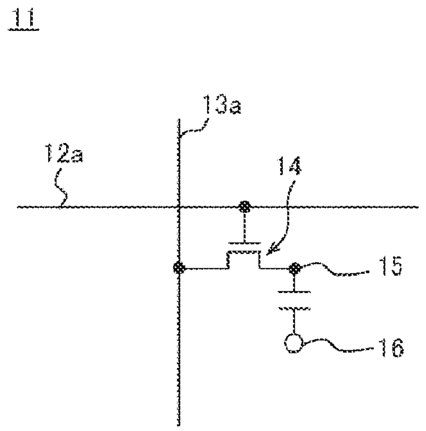
FIG. 2 is a circuit diagram illustrating a configuration of a pixel.

As illustrated in FIG. 1, the display panel 10 includes a liquid crystal display 11, a gate drive circuit 12, and a source drive circuit 13. As illustrated in FIG. 2, in the liquid crystal display 11, there are provided a gate line 12*a* connected to the gate drive circuit 12, a source line 13*a* connected to the source drive circuit 13, a thin film transistor (TFT) 14, a pixel electrode 15, and a common electrode 16. The gate line 12*a* is connected to a gate electrode of the TFT 14. The source line 13*a* is connected to a source electrode of the TFT 14. The pixel electrode 15 is connected to a drain electrode of the TFT 14. The TFT 14 and the pixel electrode 15 are disposed in a partitioned region defined by a plurality of gate lines 12*a* and a plurality of source lines 13*a* that intersect each other. The common electrode 16 is a counter electrode disposed opposite the pixel electrode 15. Furthermore, the common electrode 16 is provided in common for a plurality of pixel electrodes 15.

Figure 3:
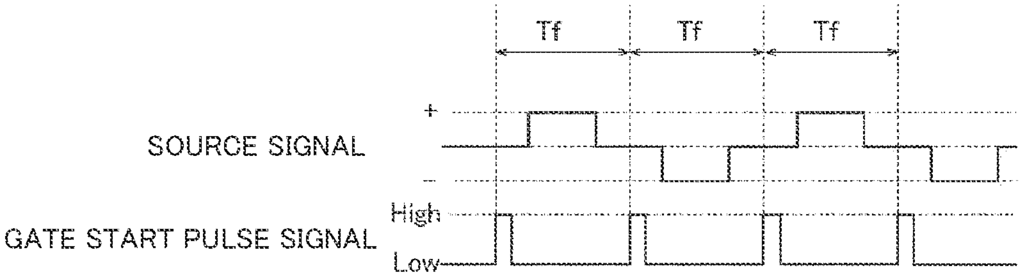
FIG. 3 illustrates an example of a waveform of a source signal and a waveform of a gate start pulse signal according to the one embodiment.

The gate drive circuit 12 supplies a gate signal to TFTs 14 of each row one after another via the gate line 12*a* in accordance with control signals (such as a gate start pulse signal synchronized with a vertical synchronization signal, and a clock signal) supplied from the control circuit 20. Incidentally, the gate start pulse signal is a signal that is output once at the beginning of one frame as illustrated in FIG. 3 and is a signal serving as a trigger for the gate drive circuit 12 starting scanning of one frame. Here, in the present disclosure, "frame" refers to an image (one frame) to be displayed on a screen to constitute a video.

The source drive circuit 13 supplies a source signal (voltage) to the pixel electrode 15 via the source line 13*a* and the TFT 14 in accordance with an image signal and a control signal (such as a horizontal synchronization signal) supplied from the control circuit 20 to charge the pixel electrode 15. Thus, the gate drive circuit 12 and the source drive circuit 13 write an image to be displayed on the liquid crystal display 11 in accordance with an input image signal.

FIG. 3 illustrates an example of a waveform of a source signal and a waveform of a gate start pulse signal according to the first embodiment. As illustrated in FIG. 3, the source drive circuit 13 reverses a polarity of a voltage to be output to the pixel electrode 15 to switch between positive (+) and negative (−) polarities every time the voltage is supplied and writes an image to be displayed on the display panel 10. Note that the source drive circuit 13 performs dot-inversion driving of applying voltages of polarities different from each other to respective adjacent pixels in a direction in which the gate line extends and respective adjacent pixels in a direction in which the source line extends. Furthermore, the source drive circuit 13 may perform column-inversion driving of applying voltages of the same polarity to adjacent pixels in a direction in which the source line extends and applying voltages of polarities different from each other to respective adjacent pixels in a direction in which the gate line extends. Furthermore, the source drive circuit 13 may apply voltages of the same polarity to all pixels. Incidentally, in the present disclosure, "writing" refers to a concept including not only changing from an image being displayed to a different image but also further writing of an image that is identical with the image being displayed to the pixel electrode 15.

As illustrated in FIG. 1, the control circuit 20 includes a frame memory 21, a memory controller portion 22, a motion detection portion 23, and a timing generation portion 24. The control circuit 20 is constituted, for example, by an integrated circuit. In FIG. 1, although the control circuit 20 is illustrated as a functional block, each of functions in the control circuit 20 may be implemented as individual hardware (circuit). Alternatively, the control circuit 20 may include a processor and execute a program to thereby provide functions of the memory controller portion 22, the motion detection portion 23, and the timing generation portion 24.

The frame memory 21 is a memory in which an image signal (pixel values (gradations) of R, G, and B) for each of pixels in the whole of at least one frame is stored. The memory controller portion 22 performs a process of writing an image signal to and a process of reading an image signal from the frame memory 21. Specifically, the memory controller portion 22 receives an image signal from the host and causes the frame memory 21 to store the image signal. Then, the memory controller portion 22 reads an image signal from the frame memory 21 in response to a command from the timing generation portion 24 and supplies the image signal to the source drive circuit 13.

The motion detection portion 23 receives an image signal from the host. Then, the motion detection portion 23 compares an image signal that is currently being input with an immediately preceding image signal that has been input (image signal stored in the frame memory 21) and detects whether there is a change (motion) between the image signal that is currently being input and the immediately preceding image signal that has been input. That is, the motion detection portion 23 determines whether or not the image signal that is currently being input and the immediately preceding image signal that has been input correspond to an identical image. For example, when pixel values (gradations) in the image signal that is currently being input differ from pixel values (gradations) in the immediately preceding image signal that has been input, the motion detection portion 23 determines that the image signal that is currently being input and the immediately preceding image signal that has been input do not correspond to an identical image. That is, when, of all the pixels, pixel values (gradations) of any one pixel are changed, the motion detection portion 23 determines that the image signal has been changed (motion has occurred). Then, the motion detection portion 23 detects a cycle in which the image signal is changed.

When a predetermined condition is satisfied, the host performs switching from a state in which the image signal is changed at 60 Hz (a frame frequency of 60 Hz) to a state in which the image signal is changed at 1 Hz (a frame frequency of 1 Hz). The above-described "predetermined condition" refers to, for example, a case where an input operation is not performed with an operation portion (such as an operation button, keyboard, or mouse), which is not illustrated, for a predetermined continuous period. In this case, the host changes, from Tf1 to Tf2, the cycle in which the image signal is changed. In the present embodiment, the state in which the image signal is changed at 60 Hz is referred to as "high-frequency mode", and the state in which the image signal is changed at 1 Hz is referred to as "low-frequency mode".

Then, the motion detection portion 23 detects that the cycle in which the image signal acquired from the host is changed has been changed from Tf1 to Tf2. That is, the motion detection portion 23 detects that a control mode of the host has been changed from the high-frequency mode to the low-frequency mode.

The timing generation portion 24 receives an image signal from the host. The timing generation portion 24 generates, in accordance with an image signal, control signals (such as a gate start pulse signal synchronized with a vertical synchronization signal, a clock signal, and a horizontal synchronization signal) to be supplied to the gate drive circuit 12 and the source drive circuit 13. Then, the timing generation portion 24 transmits control signals including a gate start pulse signal to the gate drive circuit 12 and transmits a control signal to the source drive circuit 13. For example, when the cycle in which the image signal is changed is Tf1, the timing generation portion 24 causes the gate drive circuit 12 and the source drive circuit 13 to charge (write an image to) the pixel electrode 15 at the cycle of Tf1. At this time, the memory controller portion 22 reads an image signal from the frame memory 21 and supplies the image signal to the source drive circuit 13. Furthermore, as illustrated in FIG. 4, the timing generation portion 24 controls, in accordance with the cycle in which the image signal is changed that has been detected by the motion detection portion 23, the gate drive circuit 12 and the source drive circuit 13 to change the length of a frame period Tf.

Figure 4:
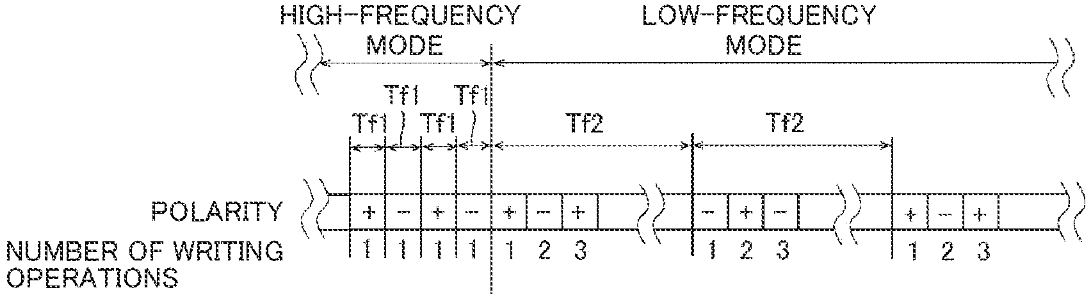
FIG. 4 illustrates the number of times writing in a high-frequency mode is performed and the number of times writing in a low-frequency mode is performed.

Here, in the present embodiment, as illustrated in FIG. 4, the timing generation portion 24 causes, in the high-frequency mode, the gate drive circuit 12 and the source drive circuit 13 to perform writing of an image once in one frame period. That is, pixel electrodes in the liquid crystal display 11 are charged once in the one frame period. Furthermore, the timing generation portion 24 causes, in the low-frequency mode, the gate drive circuit 12 and the source drive circuit 13 to perform writing of an identical image three times (an odd number of times) in one frame period. That is, the timing generation portion 24 causes the gate drive circuit 12 and the source drive circuit 13 to charge the pixel electrode 15 in accordance with an identical image signal more than once in the one frame period. For example, in an example illustrated in FIG. 4, the timing generation portion 24 causes the gate drive circuit 12 and the source drive circuit 13 to perform writing of an identical image three times in the one frame period (one Tf2). Note that, as illustrated in FIG. 4, three charges are performed while polarities of voltages are being reversed ("+", "−", and "+"). Then, in a next frame, a charge is started from a polarity (for example, "−") different from a polarity (for example, "+") of a voltage with which an immediately preceding charge has been performed (charges are performed, for example, in the order of "−", "+", and "−"). Note that "identical image signal" refers to the fact that pixel values of all the pixels remain unchanged.

Thus, even when the cycle in which the image signal is changed transitions from a state of Tf1 to a state of Tf2 longer than Tf1, the pixel electrode 15 is charged in accordance with an identical image signal more than once in one cycle (one frame period), and a period during which the pixel electrode 15 is charged therefore increases in comparison with a case where the pixel electrode 15 is charged only once. This can reduce a reduction in luminance and reduce a change in luminance.

Figure 5:
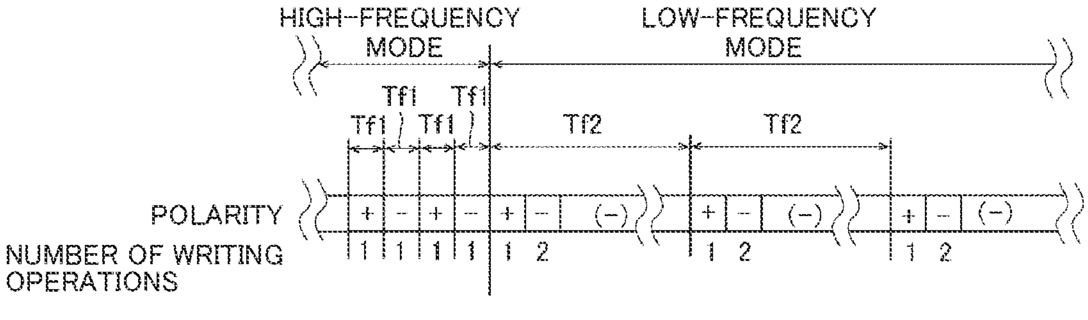
FIG. 5 illustrates the number of times writing in a first comparative example is performed.

FIG. 5 illustrates an example of operation of the display device in a first comparative example. As illustrated in FIG. 5, in the first comparative example, in the low-frequency mode, the pixel electrode is charged an even number of times (for example, twice) in one frame period. In this case, a polarity of the pixel electrode that has been charged is the same polarity ("−" in the example of FIG. 5) in any cycle (frame). In the example of FIG. 5, a period during which the pixel electrode is negatively charged is longer than a period during which the pixel electrode is positively charged. For this reason, a potential of the common electrode changes (drifts), and there is a possibility that a image-sticking phenomenon occurs in which an image lag remains in pixels. Thus, in the configuration according to the present embodiment, since the pixel electrode 15 is charged an odd number of times (for example, three times) in one frame period as illustrated in FIG. 4, a polarity of an electrical charge that the pixel electrode 15 has is reversed at every cycle (frame), and the length of a period during which the pixel electrode 15 is positively charged is the same as the length of a period during which the pixel electrode 15 is negatively charged. Consequently, a change in luminance can be reduced while the image-sticking phenomenon is kept from occurring.

Furthermore, when a change cycle in which an image signal is changed is 0.1 seconds or more, it is known that the longer the change cycle is, the less likely a person is to perceive flicker. Thus, in the above-described configuration, as illustrated in FIG. 4, the timing generation portion 24 performs charges (image writing operations) collectively in the first half of the one frame period and performs no charge in the latter half. This can keep the change cycle from decreasing in comparison with a case where three charges are performed at equal time intervals (a state in which a timing when a charge is performed is equal to 3 Hz). This can make a user who views an image less likely to perceive flicker in the image.

(Measurements of Rate of Change in Luminance in Practical Examples of Present Embodiment)

Figure 6:
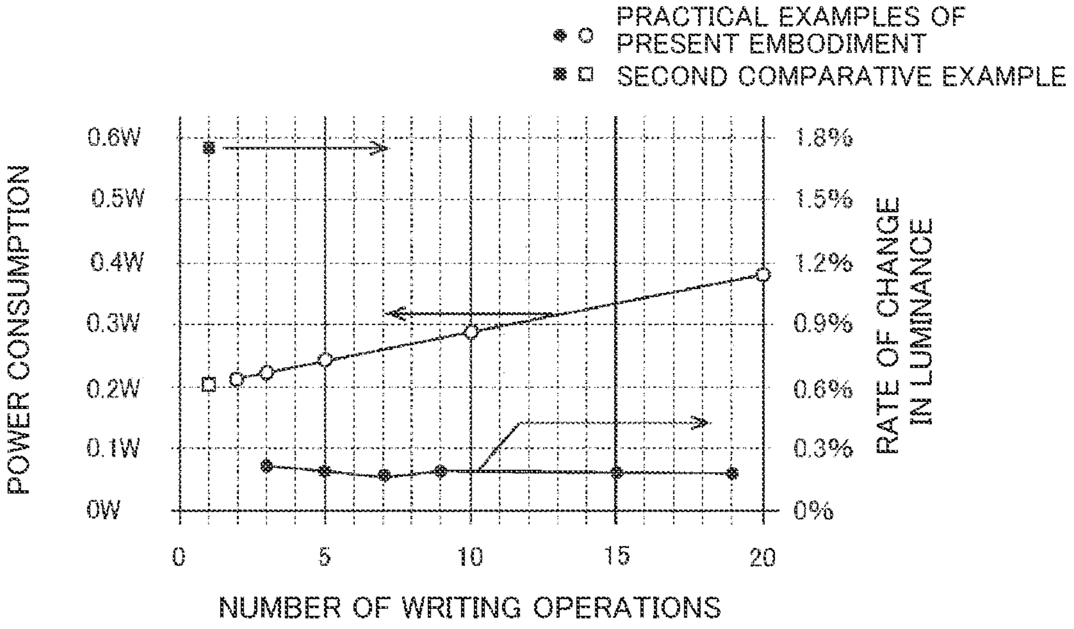
FIG. 6 is a graph illustrating measurements of the rate of change in luminance and the power consumption in practical examples of the one embodiment and a second comparative example.

Next, measurements of the rate of change in luminance in practical examples of the present embodiment and a second comparative example will be described with reference to FIG. 6. FIG. 6 is a graph illustrating measurements of the rate of change in luminance for the number of times writing is performed in one cycle (one frame period) when a state in which a cycle in which an image signal is changed is 16.6 ms (a frequency of 60 Hz) is changed to a state in which the cycle in which the image signal is changed is one second (a frequency of 1 Hz). "The rate of change in luminance" is represented by ((L60−L1)/L60), which is obtained by subtracting a luminance (referred to as "L1") in the state in which the cycle in which the image signal is changed is one second (a frequency of 1 Hz) from a luminance (referred to as "L60") in the state in which the cycle in which the image signal is changed is 16.6 ms (a frequency of 60 Hz) and by dividing a calculated difference value (L60−L1) by the luminance in the state in which the cycle in which the image signal is changed is 16.6 ms (a frequency of 60 Hz). Furthermore, FIG. 6 also illustrates a relationship between the number of times writing is performed and the magnitude of power consumption. Note that an identical image is written into the one frame.

As illustrated in FIG. 6, in the second comparative example in which the number of times writing is performed in the one cycle is one and respective practical examples in which the numbers of times writing is performed in the one cycle are 3, 5, 7, 9, 15, and 19, the rates of change in luminance were obtained. As a result, the rate of change in luminance in the comparative example is about 1.7%. All of the rates of change in luminance in the respective practical examples in which the numbers of times writing is performed are 3, 5, 7, 9, 15, and 19 are about 0.2%. That is, the rates of change in luminance are found to be reduced in the practical examples.

Furthermore, in the second comparative example in which the number of times writing is performed in the one cycle is one and respective practical examples in which the numbers of times writing is performed in the one cycle are 2, 3, 5, 10, and 20, power consumption was measured. As illustrated in FIG. 6, power consumption has a linear functional relationship with the number of times writing is performed, and power consumption is found to increase as the number of times writing is performed increases. Then, in the practical examples in which the rates of change in luminance are reduced to about 0.2%, the number of times writing is performed that has the lowest power consumption is found to be 3, and the number of times writing is performed that has the second lowest power consumption is found to be 5.

(Modifications)

Although the embodiment of the disclosure has been described above, the above-described embodiment is merely an example used to implement the disclosure. Hence, the disclosure is not limited to the above-described embodiment, and appropriate modifications can be made to the above-described embodiment without departing from the gist of the disclosure and can be implemented. Modifications of the above-described embodiment will be described below.

(1) Although, in the above-described embodiment, an example has been described in which the host controller switches between the low-frequency mode and the high-frequency mode, the present disclosure is not limited to this. The control circuit 20 of the display device 100 may perform control of switching between the low-frequency mode and the high-frequency mode.

(2) Although, in the above-described embodiment, an example has been described in which the liquid crystal display is provided in the display panel, the present disclosure is not limited to this. For example, an organic electroluminescence (EL) display may be provided in the display panel.

(3) Although, in the above-described embodiment, an example has been described in which a polarity of a source signal to be output from the source drive circuit is reversed every time a charge is performed, the present disclosure is not limited to this. For example, the polarity of the source signal may be reversed every time multiple charges are performed, or the polarity does not have to be reversed. Here, in a case where the polarity is not reversed, in the low-frequency mode, the number of times a pixel electrode is charged in one cycle (one frame period) may be an even number. That is, this is because, in the case where the polarity is not reversed, even when a charge is performed an even number of times, an imbalance in polarity does not occur and no image-sticking phenomenon occurs.

(4) Although, in the above-described embodiment, an example has been described in which writing is performed more than once in the first half of the one cycle, the present disclosure is not limited to this. For example, writing may be performed more than once in the latter half of the one cycle. If the influence of flicker does not have to be taken into consideration, writing may be performed more than once in a distributed manner in the one cycle.

(5) Although, in the practical examples of the above-described embodiment, an example has been described in which the number of times writing is performed is any one of 2, 3, 5, 7, 9, 10, 15, 19, and 20, the present disclosure is not limited to this. That is, the number of times writing is performed may be a number other than 2, 3, 5, 7, 9, 10, 15, 19, and 20 larger than one.

(6) Although, in the above-described embodiment, an example has been described in which the motion detection portion 23 that detects a cycle in which an image signal is changed is provided in the display device 100, the present disclosure is not limited to this. For example, a function of the motion detection portion may be provided outside the display device (for example, in the host). In this case, the host may transmit, to the display device, a signal representing the length of a frame period (frame rate), or a signal representing that the length of a frame period has been changed. Then, the display device may receive the above-described signal and determine that a cycle in which an image signal is changed has been changed from a first cycle to a second cycle that is longer than the first cycle.

(7) Although, in the above-described embodiment, frame frequencies in the high-frequency mode and the low-frequency mode are respectively 60 Hz and 1 Hz, the frame frequencies are not limited to this example. For example, the frame frequency in the high-frequency mode may be, for example, a frequency other than 60 Hz and may be 30 Hz or 120 Hz. Furthermore, the frame frequency in the low-frequency mode only has to be a frequency lower than the frame frequency in the high-frequency mode and may be a frequency other than 1 Hz.

The above-described configuration can also be described as follows.

A display device according to a first configuration includes a pixel electrode, a drive circuit that charges the pixel electrode in accordance with an image signal, and a control unit that controls a timing when the drive circuit charges the pixel electrode. When a cycle in which the image signal is changed is changed from a first cycle to a second cycle that is longer than the first cycle, the control unit causes the drive circuit to charge the pixel electrode in accordance with an identical image signal more than once in one cycle in which the image signal is changed (first configuration).

In the above-described first configuration, even when a transition is made from a state in which the cycle in which the image signal is changed is short to a state in which the cycle in which the image signal is changed is long, the pixel electrode is charged in accordance with an identical image signal more than once in the one cycle, and a period during which the pixel electrode is charged therefore increases in comparison with a case where the pixel electrode is charged only once. This can reduce a reduction in luminance and reduce a change in luminance.

In the first configuration, the drive circuit may reverse a polarity of a voltage to be output to the pixel electrode every time a charge is performed. When the cycle in which the image signal is changed is changed from the first cycle to the second cycle, the control unit may cause the drive circuit to charge the pixel electrode in accordance with an identical image signal an odd number of times greater than or equal to three in the one cycle (second configuration).

Here, in a case where the polarity of a voltage to be output to the pixel electrode is reversed every time a charge is performed, when the pixel electrode is charged an even number of times in the one cycle, a polarity of the pixel electrode that has been charged is the same polarity in any cycle of a plurality of cycles. For example, when, in the one cycle, a voltage of negative polarity is applied after a voltage of positive polarity is applied, the length of a period during which the pixel electrode is negatively charged is longer than the length of a period during which the pixel electrode is positively charged. In this case, there is a possibility that a image-sticking phenomenon occurs in which an image lag remains in pixels. Thus, in the above-described second configuration, since the pixel electrode is charged in accordance with an identical image signal an odd number of times greater than or equal to three in the one cycle, a polarity of an electrical charge that the pixel electrode has is reversed at every cycle. Consequently, the length of a period during which the pixel electrode is negatively charged is equal to the length of a period during which the pixel electrode is positively charged, and a change in luminance can thus be reduced while the image-sticking phenomenon is kept from occurring.

In the second configuration, a length of the second cycle may be 0.1 seconds or more. When the cycle in which the image signal is changed is changed from the first cycle to the second cycle, the control unit may cause the drive circuit to charge the pixel electrode in accordance with an identical image signal more than once in a first half of the one cycle (third configuration).

Furthermore, when a change cycle in which an image signal is changed is 0.1 seconds or more, it is known that the longer the change cycle is, the less likely a person is to perceive flicker. Thus, in the above-described third configuration, since charges (image writing operations) are performed collectively in the first half of the second cycle, the change cycle can be kept from decreasing in comparison with a case where multiple charges are performed in a distributed manner. This can make a user who views an image less likely to perceive flicker in the image.

In the second or third configuration, when the cycle in which the image signal is changed is changed from the first cycle to the second cycle, the control unit may cause the drive circuit to charge the pixel electrode in accordance with an identical image signal three times or five times in the one cycle (fourth configuration).

In the above-described fourth configuration, the number of times a charge is performed does not excessively increase, and a change in luminance can thus be reduced while an increase in power consumption is reduced.

In any one of the first to fourth configurations, when the cycle in which the image signal is changed is one second or more, the control unit may cause the drive circuit to charge the pixel electrode in accordance with an identical image signal more than once in the one cycle (fifth configuration).

Here, in a case where a cycle in which an image signal is changed is changed from a normal cycle (for example, 16.6 ms, 60 Hz) in which the image signal is changed, when the cycle is one second (1 Hz) or more, a change in luminance increases. On the other hand, in the above-described fifth configuration, when the cycle in which the image signal is changed is changed to one second, a change in luminance can be reduced. As a result, the user can be kept from perceiving a change in luminance.

A method of controlling a display device according to a sixth configuration is a method of controlling a display device including a pixel electrode, and a drive circuit that charges the pixel electrode. The method includes acquiring an image signal, and, when a cycle in which the image signal is changed is changed from a first cycle to a second cycle that is longer than the first cycle, causing the drive circuit to charge the pixel electrode in accordance with an identical image signal more than once in one cycle in which the image signal is changed (sixth configuration).

In the above-described sixth configuration, the method of controlling the display device can be provided in which a change in luminance can be reduced even when a transition is made from a period during which the cycle in which the image signal is changed is short to a period during which the cycle in which the image signal is changed is long.

The present disclosure contains subject matter related to that disclosed in Japanese Priority Patent Application JP 2023-070063 filed in the Japan Patent Office on Apr. 21, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a pixel electrode;

a drive circuit configured to charge the pixel electrode in accordance with an image signal; and a control unit configured to control a timing when the drive circuit charges the pixel electrode, wherein:

a frame period is a time interval at which the image signal is input to the control unit, the image signal corresponding to the pixel electrode is read once from a frame memory during each frame period, and when switching from a high frame frequency mode, in which the frame period is a first period, to a low frame frequency mode, in which the frame period is a second period longer than the first period, the control unit causes the drive circuit to charge the pixel electrode an odd number of times greater than or equal to three in a first half of the second period while reversing a polarity of a voltage of one image signal corresponding to the second period every time the pixel electrode is charged and does not cause the drive circuit to charge the pixel electrode in a latter half of the second period.

2. The display device of claim 1, wherein a length of the second period is 0.1 seconds or more.

3. The display device according to claim 1, wherein, when switching from the high frame frequency mode to the low frame frequency mode, the control unit causes the drive circuit to charge the pixel electrode three times or five times in the first half of the second period.

4. The display device according to claim 1, wherein a length of the second period is one second or more.

5. A method of controlling a display device including a pixel electrode and a drive circuit configured to charge the pixel electrode, the method comprising:

acquiring an image signal, an acquisition interval of the image signal being a frame period, wherein the image signal corresponding to the pixel electrode is read once from a frame memory during each frame period; and when switching from a high frame frequency mode, in which the frame period is a first period, to a low frame frequency mode, in which the frame period is a second period longer than the first period, causing the drive circuit to charge the pixel electrode an odd number of times greater than or equal to three in a first half of the second period while reversing a polarity of a voltage of one image signal corresponding to the second period every time the pixel electrode is charged and not causing the drive circuit to charge the pixel electrode in a latter half of the second period.

* * * * *